United States Patent
Bertsch et al.

(10) Patent No.: US 6,629,519 B1
(45) Date of Patent: Oct. 7, 2003

(54) INJECTION NOZZLE AND A METHOD FOR FORMING A FUEL-AIR MIXTURE

(75) Inventors: Dietmar Bertsch, Aspach (DE); Martin Bezner, Walheim (DE); Uwe Schaupp, Wernau (DE); Helmut Schorn, Neuhausen (DE); Jörg Sievert, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/810,646

(22) Filed: Mar. 16, 2001

(30) Foreign Application Priority Data

Mar. 16, 2000 (DE) .......................... 100 12 969

(51) Int. Cl.$^7$ ................................ F02B 17/00
(52) U.S. Cl. ................ 123/305; 123/309; 123/467; 239/585.5
(58) Field of Search .................... 123/298, 305, 123/309, 467, 470; 239/585.5

(56) References Cited

U.S. PATENT DOCUMENTS

| | | | | |
|---|---|---|---|---|
| 1,755,192 A | * | 4/1930 | Scott ........................... | 239/453 |
| 5,029,563 A | * | 7/1991 | Hu .............................. | 123/262 |
| 5,058,548 A | * | 10/1991 | Morikawa et al. ........... | 123/298 |
| 5,086,737 A | * | 2/1992 | Watanabe et al. ........... | 123/295 |
| 5,341,783 A | * | 8/1994 | Beck et al. .................. | 123/446 |
| 5,479,902 A | * | 1/1996 | Wirbeleit et al. ........... | 123/472 |
| 5,593,095 A | * | 1/1997 | Davis et al. ................. | 239/584 |
| 5,622,150 A | * | 4/1997 | Fraidl et al. ................ | 123/307 |
| 5,685,492 A | * | 11/1997 | Davis et al. ................. | 239/584 |
| 5,720,252 A | * | 2/1998 | Blodgett et al. ............. | 123/163 |
| 5,727,520 A | * | 3/1998 | Wirth et al. ................. | 123/305 |
| 5,740,777 A | * | 4/1998 | Yamamoto et al. .......... | 123/305 |
| 5,862,792 A | * | 1/1999 | Paul et al. ................... | 123/446 |
| 5,868,112 A | * | 2/1999 | Mahakul et al. ............. | 123/263 |
| 5,921,215 A | * | 7/1999 | Wirth et al. ................. | 123/298 |
| 5,927,244 A | * | 7/1999 | Yamauchi et al. ........... | 123/295 |
| 5,941,208 A | * | 8/1999 | Biemelt et al. ........ | 123/169 CL |
| 5,960,767 A | * | 10/1999 | Akimoto et al. ............. | 123/298 |
| 5,983,853 A | * | 11/1999 | Roessler et al. ............. | 123/295 |
| 6,047,592 A | * | 4/2000 | Wirth et al. ................. | 73/116 |
| 6,095,113 A | * | 8/2000 | Nogi et al. .................. | 123/295 |
| 6,138,637 A | * | 10/2000 | Bubeck ....................... | 123/295 |
| 6,155,499 A | * | 12/2000 | Rembold et al. ............ | 239/453 |
| 6,161,518 A | * | 12/2000 | Nakakita et al. ............. | 123/276 |
| 6,176,215 B1 | * | 1/2001 | Baur et al. .................. | 123/295 |
| 6,196,183 B1 | * | 3/2001 | Bauer et al. ................. | 123/295 |
| 6,227,164 B1 | * | 5/2001 | Miller ......................... | 123/295 |
| 6,364,221 B1 | * | 4/2002 | Czimmek ....................... | 239/5 |
| 2002/0002963 A1 | * | 1/2002 | Bertsch et al. .............. | 123/299 |

FOREIGN PATENT DOCUMENTS

| | | |
|---|---|---|
| DE | 30 15 192 | 10/1981 |
| DE | 44 41 092 | 5/1996 |
| DE | 196 42 653 | 1/1998 |
| DE | 196 38 025 | 3/1998 |
| DE | 198 15 266 | 10/1998 |
| WO | WO 00/55481 | * 9/2000 ........... F02B/23/10 |

* cited by examiner

Primary Examiner—Tony M. Argenbright
Assistant Examiner—Hai H. Huynh
(74) Attorney, Agent, or Firm—Kenyon & Kenyon

(57) ABSTRACT

A cylinder head for an internal combustion engine includes a spark plug 3, provided in combustion chamber 2, and an injection nozzle 1 that has a housing end face 27 and a closure element 6 which is movable by an actuator and has a closure member 10, the housing end face 17 of the injection nozzle 1 forming a common, planar surface with the closure member 10 in the closed state of the injection nozzle 1.

17 Claims, 2 Drawing Sheets

INJECTION NOZZLE AND A METHOD FOR FORMING A FUEL-AIR MIXTURE

FIELD OF THE INVENTION

The present invention relates to a cylinder head for an internal combustion engine, having a spark plug, provided in the combustion chamber, and an injection nozzle that includes a housing end face and a closure element that is movable by an actuator and has a closure member. The invention also relates to a method for forming an ignitable fuel-air mixture.

BACKGROUND INFORMATION

A method for forming an ignitable fuel-air mixture is described in German Published Patent Application No. 196 42 653. An ignitable fuel-air mixture can be formed in the cylinders of direct-injection internal combustion engines, in that after a valve element has lifted off from a valve seat surrounding a nozzle opening, thus releasing the nozzle opening, fuel is injected by an injector into each combustion chamber bounded by a piston. The opening stroke of the valve element and the injection time are variably adjustable in order to permit an internal mixture formation, optimized with respect to consumption and emissions, in each operating point of the entire characteristics map under all operating conditions of the internal combustion engine, particularly in stratified operation. A change in the jet geometry due to combustion residues at the nozzle opening of the injection nozzle, and thus an increased soot output as a result of poor mixture formation in stratified lean operation, as well as the reduction in ignition reliability due to changing mixture quality at the spark plug are possible. Moreover, increased components of unburned fuel result due to thinning of mixture regions in stratified lean operation. Added to this are a wetting of the spark plug and consequently its failure due to carbon fouling, increased emissions because of incomplete combustion of the mixture state at the spark plug due to statistical scattering of the injection jet, and a collapse of the injection jet caused by the combustion residues at the nozzle opening.

It is an object of the present invention to ensure ignition reliability in every operating point and to avoid a change in the fuel-jet geometry due to combustion residues at the nozzle opening of the injection nozzle.

SUMMARY

The above and other beneficial objects of the present invention are achieved in that a housing end face of the injection nozzle forms a common, planar surface with the closure member in the closed state of the injection nozzle. Achieved by this is that the combustion residues, which accumulate in the region of the nozzle outlet, are broken up by the outwardly opening valve member during the next injection process and are detached by the emergent fuel jet. A growth in combustion residues in the region of the outlet opening or nozzle opening is prevented in this manner.

The planar surface of the closure member and the housing end face of the injection nozzle may form a cone-shaped lateral surface directed toward the combustion chamber, and the closure member may include a conical sealing surface sealing the nozzle opening and a cone-shaped lateral surface directed toward the combustion chamber.

The injection nozzle may include a housing wall having an inner side curve-shaped or conical and/or constructed as a diffuser in the region of the nozzle opening, and the generatrix of the conical sealing surface of the closure element may extend tangentially or in parallel with respect to the curve-shaped or conical part of the housing wall, the generatrix of the fuel cone extending in parallel with respect to the sealing surface or tangentially with respect to the curve-shaped part of the housing wall and forming a right angle with the outer conical surfaces. Thus, the tangentially arranged sealing surfaces form no outward corners or edges on which combustion residues could accumulate. The fuel jet, continuously accelerated because of the nozzle shape, therefore emerges at right angles from the nozzle opening and cannot be influenced by existing combustion residues in the further region of the outlet opening.

The fuel jet emerging from the injection nozzle may be more or less conical and may exhibit a constant jet angle a regardless of the position or setting of the closure element. Thus, the jet angle is independent of the fuel quantity introduced. The optimal mixture formation may therefore be ensured in every operating point.

According to an example embodiment of the present invention, a nozzle opening of the injection nozzle may have a distance (A) of 1 mm to 8 mm to a combustion-chamber top and a distance (B) of 10 mm to 15 mm to the spark plug, the injection pressure of the injection nozzle varying between 100 bar and 300 bar or between 150 bar and 250 bar. The fuel-jet formation in the form of a toroidal swirl, necessary for an optimal mixture formation, is thereby achieved. In this context, the position of the spark plug and that of the fuel jet are decisive parameters.

The combustion-chamber top may have an angle $\beta$, the jet angle $\alpha$ being 10% to 50% smaller than angle $\beta$ of the combustion-chamber top. Wetting of the combustion-chamber top, i.e., striking of the toroidal swirl on the combustion-chamber top, may thus be prevented.

In connection with the arrangement according to the present invention, the fuel jet may include at least one, or one inner and one outer, toroidal swirl at the end of its cone envelope in the region of the piston. Optimal mixture formation is consequently achieved in the entire combustion chamber.

The closure element may be mounted in a coaxially rotational manner and may be movable at any time by the actuator between 10 $\mu$m and 80 $\mu$m axially into the combustion chamber. Therefore, the rotatable closure member carries a speed component in the circumferential direction into the fuel jet or fuel cone, thus improving the mixture formation and the fuel feed.

In addition, the closure member may include a conical sealing surface having an angle $\beta$ between 70° and 90° or between 70° and 85°, and a housing of the injection nozzle may include a curve-shaped parabolic or conical outlet cross-section, which together form the sealing seat or the sealing surface of the injection nozzle. Achieved by this is that the nozzle opening continuously tapers toward the outlet, and the fuel jet is therefore continuously accelerated up to its emergence. In this context, the fuel jet has a jet angle $\alpha$ regardless of the position of the closure element.

From the standpoint of process engineering, after the injection of each partial quantity, the closure member of the injection nozzle may be able to be brought into its closed position. The fuel feed, i.e., the two fuel pulses, are thereby fed in a defined manner at the respective instant and therefore make a perceptible contribution to the optimal mixture formation. Closing of the nozzle opening without a reduction in the fuel pressure at hand markedly improves the respective fuel pulse.

In this connection, 70% to 99% or 80% to 99% of the entire fuel quantity may be first introduced, and after 0.05 ms to 0.4 ms or 1° to 5° arc of crankshaft rotation, the remaining partial quantity may be introduced, the injection cycle being completed between 50° and 5° arc of crankshaft rotation before top dead center. The main fuel quantity introduced first may be prepared by the second pulse, resulting in an unthinned, ignitable fuel-air mixture.

The fuel may be introduced as a fuel cone, and at least one toroidal swirl may be produced at the end of its cone-shaped lateral surface in the region of a piston. The toroidal swirl carries the introduced fuel inside and outside of the fuel cone into the further regions of the combustion chamber and into the region of the spark plug.

DETAILED DESCRIPTION

Figure 1:
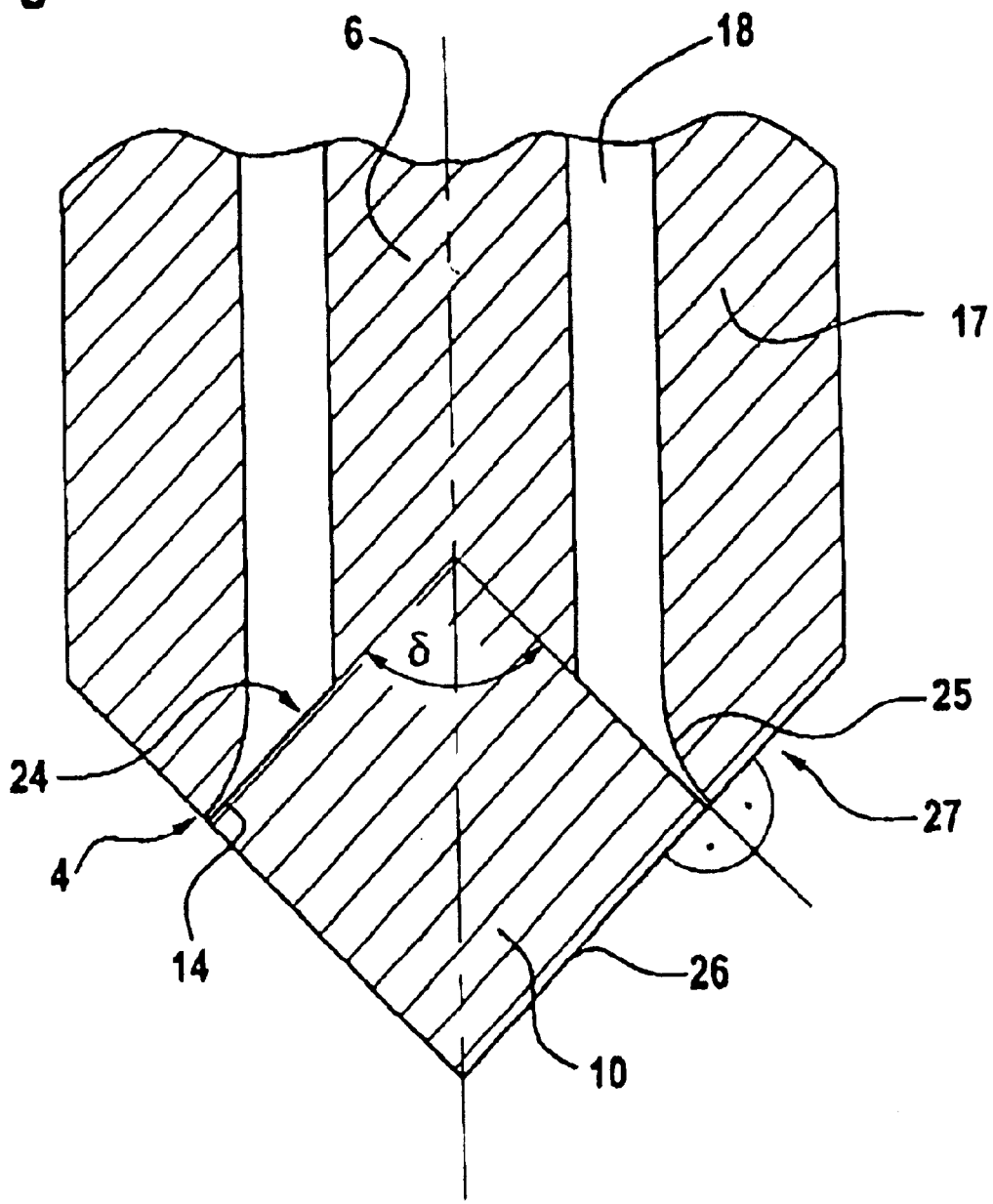
FIG. 1 is a cross-sectional view of an injection nozzle of an injector.

FIG. 1 illustrates an injection nozzle 1 having a closure element 6 and a closure member 10. In addition, the injection nozzle includes a cylindrical housing 17 formed about a longitudinal axis, and a fuel chamber 18 arranged between housing wall 17 and closure element 6.

Closure element 6 is mechanically coupled at its upper end to an actuator and to a return spring. The actuator is a piezo element which expands under electrical voltage and thereby ensures the lift of closure element 6. In addition to the spring energy, the pressure prevailing in fuel chamber 18 exerts a restoring force on an upper end face of closure element 6. The imperviousness of injection nozzle 1 is therefore ensured at every instant.

Injection nozzle 1 includes a nozzle opening 4 as well as closure member 10. Nozzle opening 4 is formed by a curve-shaped part 25 at the lower end of housing wall 17. Curve-shaped part 25 of housing wall 17 is configured to be curve-shaped or parabolic in cross-section on the inner side, i.e., at the end of fuel chamber 18.

Closure member 10 is formed as a double cone, i.e., it has a cone, i.e., a conical outer surface 26, both downward toward the combustion-chamber side, as well as inward toward combustion chamber 2. This inner part represents a conical sealing surface 24 and, together with inner, curve-shaped or parabolic part 25 of housing 17, forms a sealing seat 14 and nozzle opening 4, respectively. In this context, the cone generatrix of cone 24 forms the tangent to inner, curve-shaped part 25 of nozzle opening 4. Toward an outer side, i.e. toward housing end face 27 of injection nozzle 1, both sealing surfaces 24, 25 ultimately run in parallel and form a right angle with outer generatrix 25 of closure member 10. End face 27 of housing wall 17 located in this region is accordingly formed as a partial conical surface and has a planar junction, i.e., a common conical surface with a cone-shaped lateral surface, i.e., generatrix 26 in the closed state of injection nozzle 1. Consequently, in the closed state, cone-shaped lateral surface 26 is enlarged by the lower part of housing 17, i.e., end face 27. The cross-section of fuel chamber 18 therefore tapers continuously toward sealing seat 14 and is equal to zero in the closed state.

In response to an axial shift of closure element 6, closure member 10 with its sealing surface 24 is lifted from curve-shaped part 25 of housing 17 into combustion chamber 2 and therefore frees nozzle opening 4 for the fuel at hand. In this context, the opening stroke of closure element 6 and the duration of time that nozzle opening 4 is released determine the rate of fuel flow through nozzle opening 4 and consequently the total amount or partial amount of fuel fed.

Figure 2:
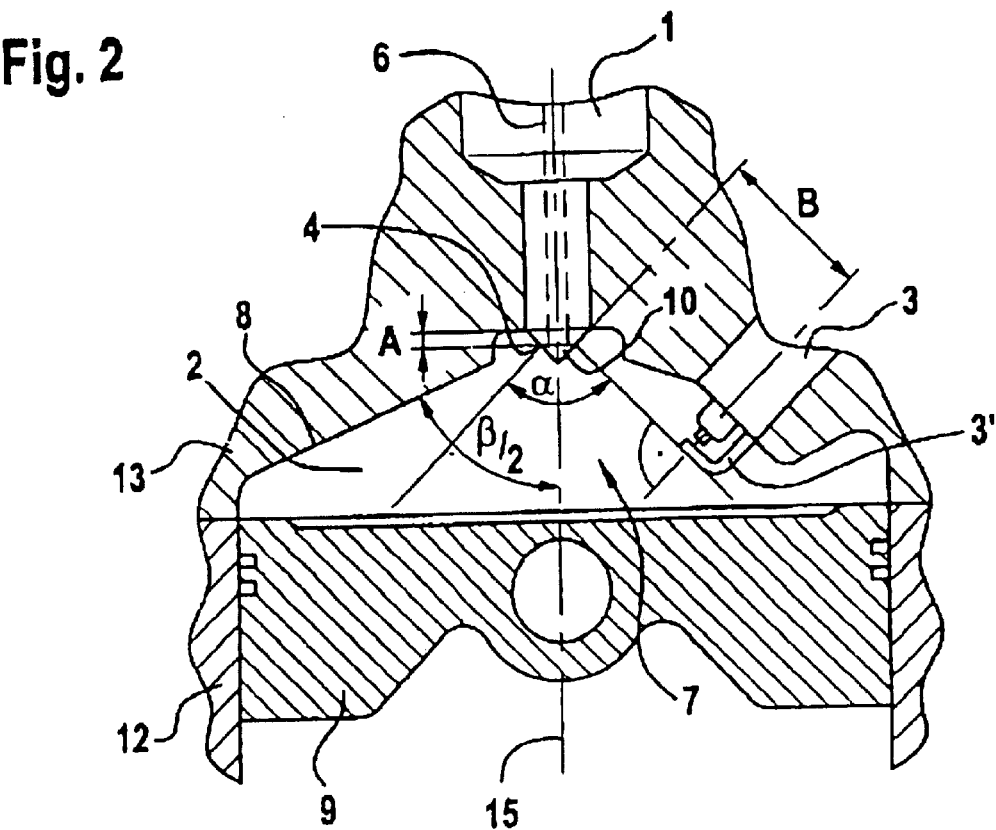
FIG. 2 is a cross-sectional view of one cylinder having a piston, an injection nozzle and a spark plug.
Figure 3:
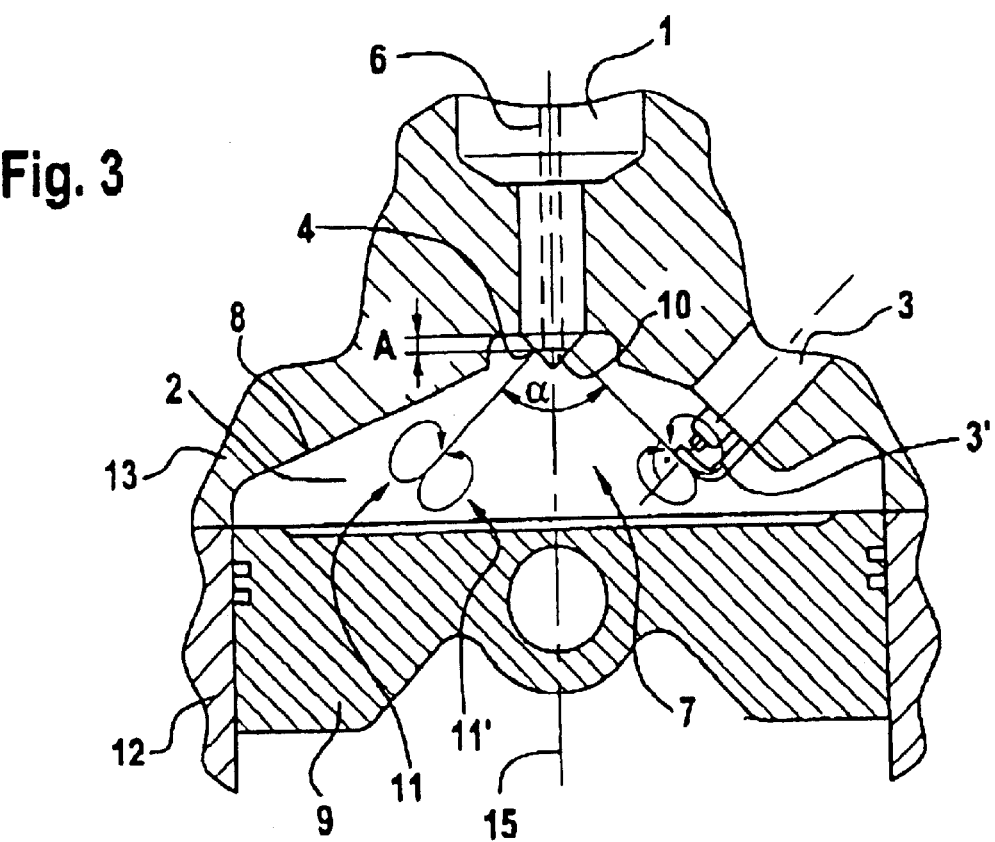
FIG. 3 is a cross-sectional view of one cylinder having a piston, an injection nozzle, a spark plug and a toroidal swirl.

FIGS. 2 and 3 illustrate one cylinder 12 of a direct-injection internal combustion engine, in which a piston 9, with a cylinder head 13 closing cylinder 12, bounds combustion chamber 2. Injection nozzle 1 for fuel is arranged co-axially in cylinder head 13 with a clearance of 0 mm to 10 mm to a cylinder axis 15. Cylinder head 13, i.e., a combustion-chamber top 8, is cone-shaped or roof-shaped in this region, injection nozzle 1 being disposed in the highest point, i.e., in the region of the actual cone point or roof ridge.

A control unit determines specifically for each operating point of the internal combustion engine, the instant, assigned to the position of a crankshaft, i.e., of a respective piston 9, for the release of a nozzle opening 4 of injection nozzle 1. The fuel enters through it as fuel cone 7 in different partial sections of an injection cycle into combustion chamber 2.

An ignitable fuel-air mixture is formed in combustion chamber 2 by the charge air, supplied to cylinder 12 through the intake port, and the injected fuel.

In stratified operation, the fuel is injected during the compression stroke. With the injection process, a mixture cloud forms in combustion chamber 2 starting from injected fuel cone 7. Fuel cone 7 forms an angle $\alpha$ between 70° and 90° which is always somewhat smaller than angle $\beta$ of combustion-chamber top 8. A spark plug 3 is positioned in combustion chamber 2 so that its center axis is oriented more or less normal to, i.e., with a deviation between 0° and 30°, fuel cone envelope 7, which means fuel cone envelope 7 substantially does not moisten a ground electrode 3' of spark plug 3. In response to an injection pressure between 100 bar and 300 bar, so-called toroidal swirls 11, 11' develop in the region of piston 9, starting from the fuel-jet generatrix (see FIG. 2). Toroidal swirl 11 develops due to a rolling-up of fuel cone 7 starting from the generatrix of fuel cone 7, before fuel cone 7 strikes piston 9. A toroidal swirl 11 forms on the outer side of the cone over the cone periphery toward combustion-chamber top 8. With the developing toroidal swirl 11, i.e., in the region of toroidal swirl 11, the fuel is mixed with the combustion-chamber air. Since outer toroidal swirl 11 develops above fuel cone 7, an ignitable, unthinned fuel-air mixture is formed in the region of spark plug 3, i.e., at its electrode 3'. A second toroidal swirl 11' develops within fuel cone 7. In this case, an ignitable, unthinned fuel-air mixture is produced in the region of injection nozzle 1.

What is claimed is:

1. A cylinder head for an internal combustion engine, comprising:
    a spark plug arranged in a combustion chamber; and
    an injection nozzle having a housing end face and a closure element, the closure element being movable by an actuator and having a closure member;
    wherein the closure member includes a conical sealing surface configured to seal a nozzle opening and a cone-shaped lateral surface directed toward the combustion chamber, wherein a generatrix of the conical sealing surface of the closure member extends tangentially with respect to a curve-shaped part of a housing wall; and
    wherein the housing end face of the injection nozzle forming a common planar surface with the closure member in a closed state of the injection nozzle.

2. The cylinder head according to claim 1, wherein the planar surface of the closure member and the housing end face of the injection nozzle forms a cone-shaped lateral surface directed toward the combustion chamber.

3. The cylinder head according to claim 1, wherein the injection nozzle includes a housing wall having an inner side one of curve-shaped and conical.

4. The cylinder head according to claim 3, wherein the injection nozzle is formed as a diffuser in a region of the nozzle opening.

5. The cylinder head according to claim 1, wherein a generatrix of a fuel cone extends in parallel with respect to the sealing surface; and
wherein the generatrix of the fuel cone forms a right angle with the outer conical surfaces.

6. The cylinder head according to claim 1, wherein the injection nozzle is configured to eject a substantially conical fuel jet, the fuel jet having a constant jet angle independent of a position and a setting of the closure element.

7. The cylinder head according to claim 6, wherein a distance from a nozzle opening of the injection nozzle to a combustion chamber is 1 mm to 8 mm and a distance from the nozzle opening to the spark plug is 10 mm to 15 mm, an injection pressure of the injection nozzle being one of between 100 bar and 300 bar and between 150 bar and 250 bar.

8. The cylinder head according to claim 7, wherein the jet angle is one of 10% to 50% smaller and 20% to 30% smaller than an angle of the combustion chamber top.

9. The cylinder head according to claim 6, wherein the fuel jet includes at least one toroidal swirl at an end of a cone envelope in a region of a piston.

10. The cylinder head according to claim 6, wherein the fuel jet includes one inner and one outer toroidal swirl at an end of a cone envelope in a region of a piston.

11. The cylinder head according to claim 1, wherein the closure element is mounted in a coaxially rotational manner and is movable at any time via the actuator one of between 0 μm and 80 μm and between 10 μm and 50 μm axially into the combustion chamber.

12. The cylinder head according to claim 1, wherein the closure member includes the conical sealing surface at an angle of one of between 70° and 90° and between 70° and 85°, and the housing of the injection nozzle includes one of a curve-shaped and a conical outlet cross-section forming one of a sealing seat and a sealing surface of the injection nozzle.

13. The cylinder head according to claim 1, wherein the injection nozzle is formed as a diffuser in a region of the nozzle opening.

14. The cylinder head according to claim 1, wherein a generatrix of a fuel cone extends tangentially relative to a curve-shaped part of a housing wall, and wherein the generatrix of the fuel cone forms a right angle with the outer conical surfaces.

15. A method for forming an ignitable fuel-air mixture in a combustion chamber of a direct-injection internal combustion engine having an injection nozzle, the injection nozzle having a housing end face, the injection nozzle including a closure member, the method comprising the steps of:

introducing a fuel into the combustion chamber via the injection nozzle in at least two partial quantities; and moving the injection nozzle into a closed position after introducing each partial quantity;

wherein in the closed state of the injection nozzle, the housing end face of the injection nozzle forms a common planar surface with the closure member; and wherein the closure member includes a conical sealing surface configured to seal a nozzle opening and a cone-shaped lateral surface directed toward the combustion chamber, and wherein a generatrix of the conical sealing surface of the closure member extends tangentially with respect to a curve-shaped part of a housing wall.

16. The method according to claim 15, wherein the introducing step includes the substeps of:

introducing one of between 70% and 99% and between 80% and 99% of an entire fuel quantity; and introducing a remaining partial quantity after one of between 0.05 ms and 0.4 ms and between 1° and 5° arc of crankshaft rotation;

wherein the introducing step is completed between 50° and 5° arc of crankshaft rotation before top dead center.

17. The method according to claim 15, wherein the fuel is introduced in the introducing step as a fuel cone, at least one toroidal swirl being produced at an end of a cone-shaped lateral surface in a region of a piston.

* * * * *

UNITED STATES PATENT AND TRADEMARK OFFICE
CERTIFICATE OF CORRECTION

PATENT NO.   : 6,629,519 B1
DATED        : October 7, 2003
INVENTOR(S)  : Bertsch et al.

It is certified that error appears in the above-identified patent and that said Letters Patent is hereby corrected as shown below:

Column 2,
Line 16, change "jet angle a" to -- jet angle $\alpha$ --.

Signed and Sealed this

Tenth Day of August, 2004

JON W. DUDAS
*Acting Director of the United States Patent and Trademark Office*